United States Patent [19]

Ariyoshi, deceased

[11] Patent Number: 5,207,749
[45] Date of Patent: May 4, 1993

[54] INNER SURFACE SHAPER

[75] Inventor: Yukihiko Ariyoshi, deceased, late of Yamaguchi, Japan, by Kiyoko Ariyoshi, heiress

[73] Assignees: Kabushikikaisha Otec, Kurashiki; Kabushikikaisha Ariyoshikikoushudan, Yamaguchi, both of Japan

[21] Appl. No.: 834,831

[22] Filed: Feb. 13, 1992

[51] Int. Cl.$^5$ .............................................. B23C 3/00
[52] U.S. Cl. ............................. 409/143; 409/189; 409/232
[58] Field of Search ............... 409/143, 183, 185, 189, 409/197, 231, 232, 242

[56] References Cited

U.S. PATENT DOCUMENTS 4,141,279  2/1979  Abel et al. ........................ 409/143

FOREIGN PATENT DOCUMENTS 71606   3/1989  Japan ........................ 409/232
237729  9/1990  Japan ........................ 409/197

Primary Examiner—Daniel W. Howell
Attorney, Agent, or Firm—Jones, Tullar & Cooper

[57] ABSTRACT

Disclosed is an improved inner surface shaper comprising, on a bed, a first reciprocating stock having a first working spindle and a drive screw, a servomotor to drive the drive screw for making a linear reciprocation of the first reciprocating stock, a second reciprocating stock having a second working spindle, a hydraulic cylinder to drive the second reciprocating stock toward and apart from the first reciprocating stock, and a tool rest placed between the first working spindle and the second working spindle. The first working spindle, second working spindle, drive screw and hydraulic cylinder are arranged along the center line of the bed, and the hydraulic cylinder and first reciprocating stock are connected by two joint rods which are arranged symmetrically with respect to the center line of the bed.

This arrangement has the effect of directing undesired counter force to the joint rods and the longitudinal axis of the drive screw. Thus, there is no fear of causing any distortion as would bend either working spindle or would injure the threads of the drive screw.

1 Claim, 5 Drawing Sheets

INNER SURFACE SHAPER

BACKGROUND OF THE INVENTION

1. Field of the Invention

The present invention relates to an improvement in or relating to a machine which cuts and shapes the inner surface of a given work piece such as a differential gear used in an automobile.

2. Description of the Prior Arts

FIG. 7 shows a conventional inner surface shaper. It comprises, on a bed 10, left and right reciprocating stocks 63 and 64 each carrying a working spindle 61 or 62 and a motor (not shown), and associated reciprocating drives 69 and 70 each having a hydraulic cylinder 65 or 66 to make a linear reciprocating motion of the reciprocating stock along an associated drive screw 67 or 68, thereby permitting these reciprocating stocks 63 and 64 to move toward and apart from each other. In operation the reciprocating drives 69 and 70 drive the reciprocating stocks 63 and 64 to move toward each other until a tool 73 has been sandwiched between the opposite tool supports 71 and 72 of the working spindles 61 and 62 for rotating. The hydraulic cylinder 65 drives the reciprocating stock 63 toward a stopper 74 to cut and shape the inner surface of the work piece 75.

The feeding of the tool 73 by the hydraulic cylinder 65, however, is liable to be dependent on the temperature of the oil in the cylinder, lowering the accuracy with which the cutting-and-shaping is effected. Also disadvantageously, the accurate setting of feeding distance is hardly attainable with recourse to the positioning of the stopper 74.

In an attempt to reduce such disadvantages the inventor proposed that the conventional inner surface shaper is modified by using, in place of the reciprocating drive 69, a drive screw extending under the reciprocating stock 63 and threadedly engaged with a nut which is fixed to the bottom of the reciprocating stock 63 and by using a servomotor to drive the drive screw for making a linear reciprocation of the reciprocating stock 63. In operation the tool is put in position by driving the reciprocating stock 63 with the aid of the nut-and-screw drive, and then the hydraulic cylinder 66 pushes the tool support 72 against the tool, which is fed by the nut-and-screw drive. This arrangement permits the accurate setting of feeding distance, and accordingly the accuracy with which the tool can give the work piece a desired shape is improved.

In this improved inner surface shaper, however, the pushing and supporting of the tool 73 by the hydraulic cylinder 66 and the feeding of the reciprocating stock 63 by the servomotor through the nut-and-screw drive will cause counter force to push the opposite reciprocating stocks 63 and 64 away from each other, thus causing a distortion in the opposite reciprocating stocks. Therefore, the machining accuracy is limited. Such a distortion causes slight vibration in machining, the bending of the screw drive or uneven wearing of parts which move relative to each other. For these reasons the machining accuracy cannot be retained for an extended period.

SUMMARY OF THE INVENTION

One object of the present invention is to provide an inner surface shaper which can give a work piece a desired shape with an increased accuracy To attain this object an inner surface shaper according to the present invention comprises, on a bed, a first reciprocating stock having a first working spindle and a drive screw aligned with each other, a first reciprocating drive having a servomotor to drive said drive screw for making a linear reciprocating motion of said first reciprocating stock, a second reciprocating stock having a second working spindle in opposite relation with said first working spindle, a second reciprocating drive having a hydraulic cylinder to drive said second reciprocating stock toward and apart from said first reciprocating stock, and a tool rest placed between said first working spindle and said second working spindle to permit a tool to cut and shape the inner surface of a work piece, said first reciprocating stock and said second reciprocating stock being arranged and movably fixed to said bed with said first working spindle, said second working spindle, said drive screw and said hydraulic cylinder arranged along the center line of said bed; said hydraulic cylinder and said first reciprocating stock being connected by two joint rods which are arranged symmetrically with respect to the center line of said bed.

In operation the servomotor and the drive screw drive the first working spindle until it abuts and supports the tool on one side thereof whereas the hydraulic cylinder drives the second working spindle until it abuts and supports the tool on the other side thereof.

Thanks to the connection between the first reciprocating stock and the hydraulic cylinder by the joint rods the counter force to the push by the hydraulic cylinder will be borne by the joint rods, thus preventing the withdrawal of the first reciprocating stock, and hence the distortion which otherwise, would be caused thereby.

The first working spindle, second working spindle, drive screw and hydraulic cylinder are arranged along the center line of the bed, and two joint rods are arranged symmetrically with respect to the center line of the bed. This arrangement assures that the counter force is directed on the center line of the bed, preventing deviation of the counter force therefrom. Thus, no distortion can be caused to bend either working spindle.

The joint between the hydraulic cylinder and the first reciprocating stock permits the simultaneous displacement of the first reciprocating stock and the second working spindle in one and same direction at the time of feeding the tool, keeping the first and second reciprocating stocks at a constant interval. Therefore, the feeding of the tool by the servomotor cannot be opposed by the pressure applied by the hydraulic cylinder, and the feeding of the tool can be effected independent from the pressure applied by the hydraulic cylinder. Accordingly, a relatively small servomotor may be used.

For the same reasons no strong force can be applied to the drive screw. The arrangement of the drive screw in alignment with the first working spindle, second working spindle and hydraulic cylinder assures that the counter force caused by the feeding of the tool is directed to the axis of the drive screw, causing neither bending nor uneven wearing of the drive screw and maintaining an increased machining accuracy for an elongated time.

BRIEF DESCRIPTION OF THE DRAWING

Other objects and advantages will be understood from the following description of an inner surface shaper according to one embodiment of the present invention, which is shown in accompanying drawings.

DETAILED DESCRIPTION OF PREFERRED EMBODIMENTS

Figure 1:
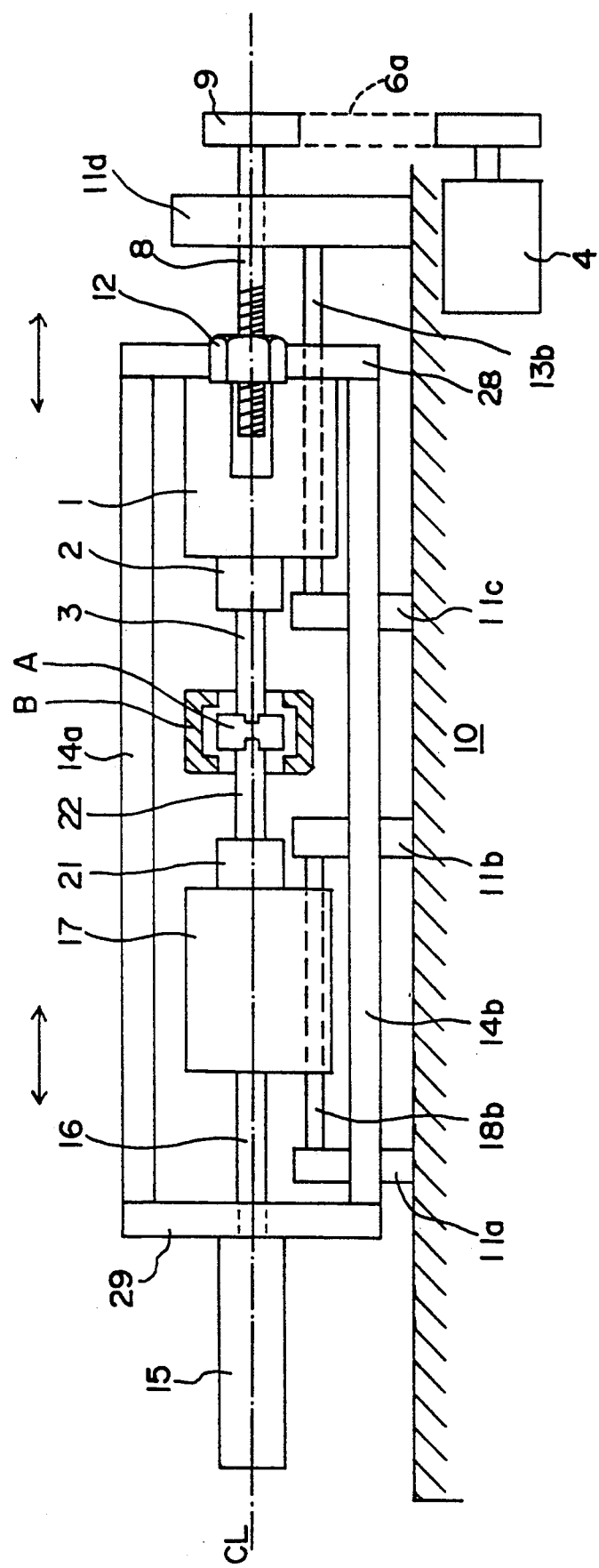
FIG. 1 shows schematically an inner surface shaper according to one embodiment of the present invention.
Figure 2:
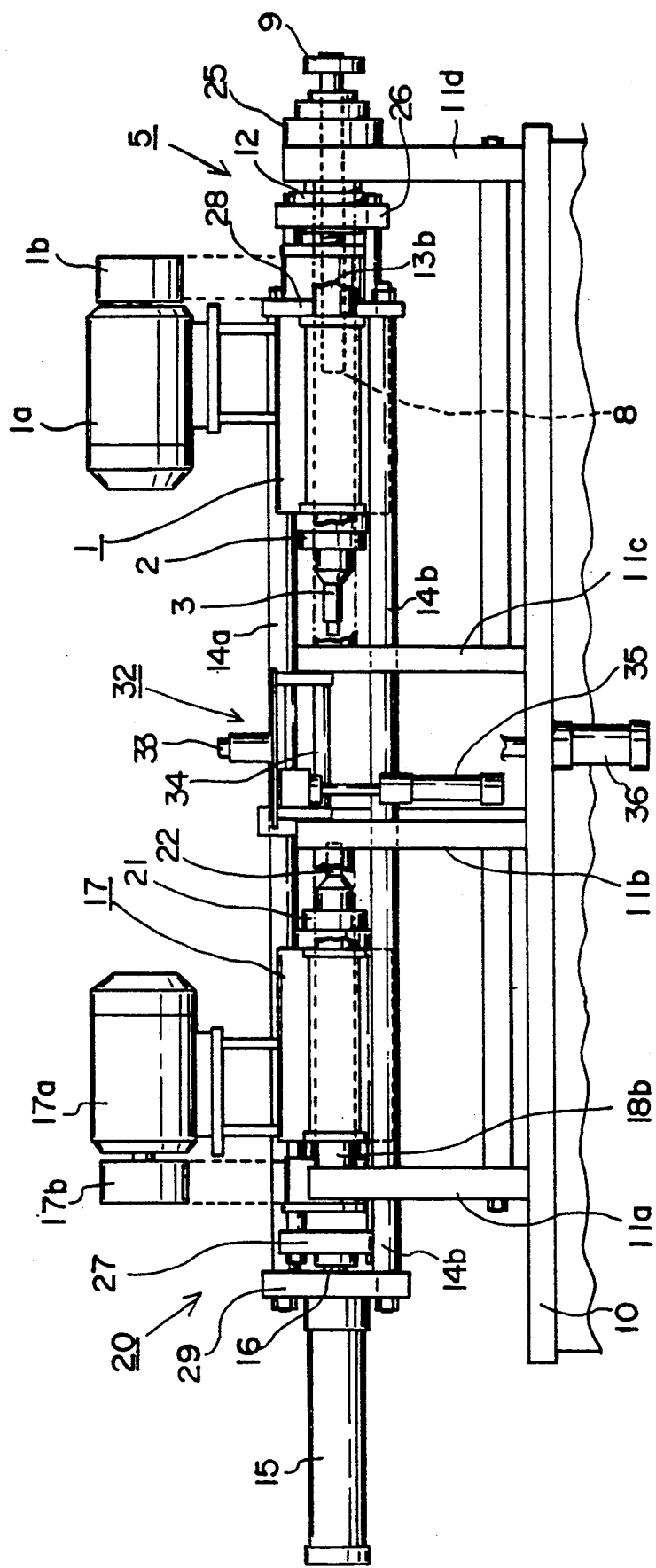
FIG. 2 is a front view of the inner surface shaper.
Figure 3:
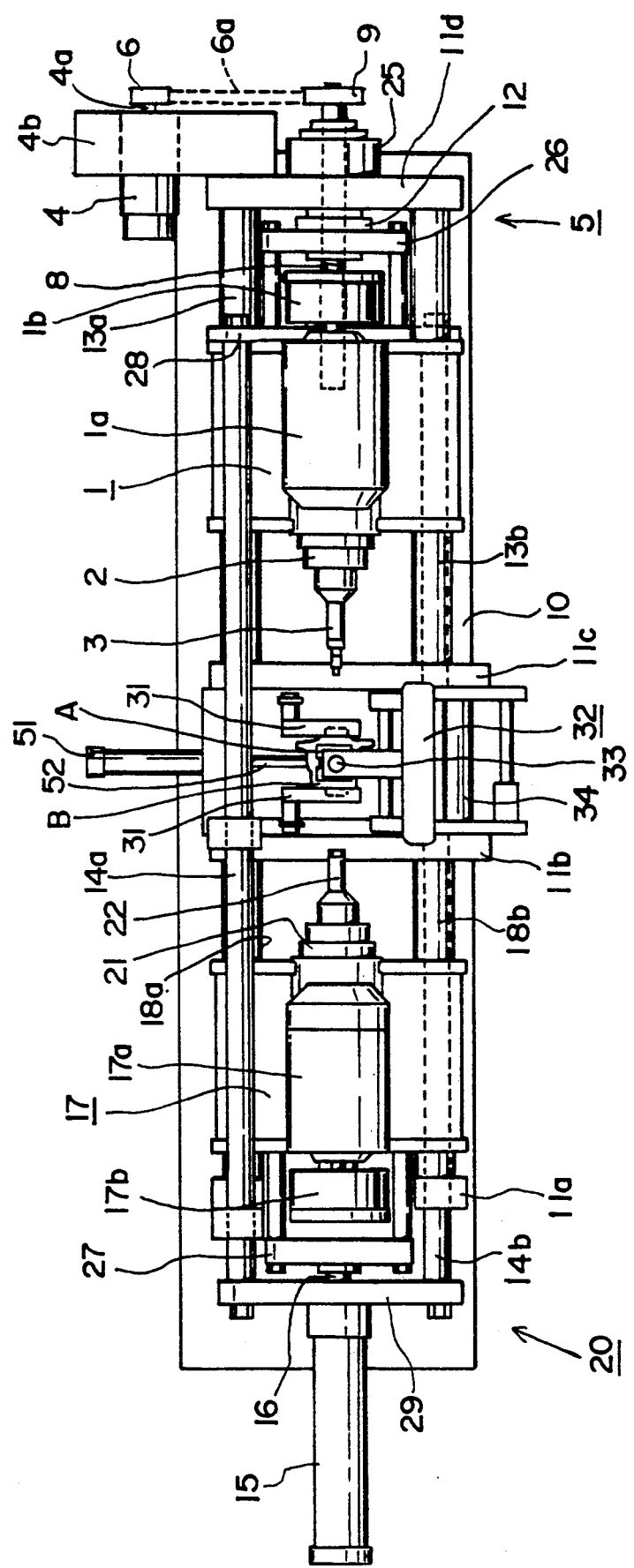
FIG. 3 is a plane view of the inner surface shaper.

Referring to FIGS. 1, 2 and 3, an inner surface shaper according to the present invention comprises essentially a first reciprocating stock 1 and a second reciprocating stock 17 on a bed 10. The first reciprocating stock 1 has a first working spindle 2 and a drive screw 8 aligned with each other. A first reciprocating drive 5 has a servomotor 4 to drive the drive screw 8 for making a linear reciprocating motion of the first reciprocating stock 1. Likewise, the second reciprocating stock 17 has a second working spindle 21 in opposite relation with the first working spindle 2. A second reciprocating drive 20 has a hydraulic cylinder 15 to drive the second reciprocating stock 17 toward and apart from the first reciprocating stock 1. A tool rest is placed between the first working spindle 2 and the second working spindle 21 to permit a tool A to cut and shape the inner surface of a work piece B such as a differential gear which is used in an automobile. The first reciprocating stock 1 and the second reciprocating stock 17 are movably fixed to the bed 1 with the first working spindle 2, the second working spindle 21, the drive screw 8 and the hydraulic cylinder 15 arranged along the center line of the bed 10. The hydraulic cylinder 15 and the first reciprocating stock 1 are connected by two joint rods 14a and 14b which are arranged symmetrically with respect to the center line of the bed 10.

Specifically, the tool A is sandwiched between tool supports 3 and 22, which are attached to the first and second working spindles 2 and 21. The bed 10 has four supports 11a to 11d. As best seen from FIG. 3, the servomotor 4 is fixed to the support 11d via associated motor mount 4b, and the servo motor 4 has a belt wheel 6 on its shaft 4a. The drive screw 8 is journalled in a bearing 25, which is fixed to the support 11d. The drive screw 8 has a belt wheel 9 fixed to its end, and the belt wheel 9 is connected to the belt wheel 6 of the servo motor 4 by an endless belt 6a.

The first reciprocating stock 1 carries an electric motor 1a to drive the first working spindle 2 via an associated belt wheel 1b. As described earlier, the tool support 3 is attached to the first working spindle 2 to support a cutting tool A. The first reciprocating stock 1 has a nut 12 fixed to its rear end via a fixture 26, and the drive screw 8 is threadedly engaged with the nut 12. The first reciprocating stock 1 has slide rods 13a and 13b on both sides, and the opposite ends each of these slide rods 13a and 13b are fixed to the supports 11c and 11d. The servomotor 4, the drive screw 8, the nut 12, the supports 11c and 11d and the slide rods 13a and 13b make up the first reciprocating drive 5.

The second reciprocating stock 17 carries an electric motor 17a to drive the second working spindle 21 via an associated belt wheel 17b. As described earlier, the tool support 22 is attached to the second working spindle 21. The piston 16 of the hydraulic cylinder 15 is fixed to the rear side of the second reciprocating stock 17. The second reciprocating stock 17 has slide rods 18a and 18b on both sides, and the opposite ends each of these slide rods 18a and 18b are fixed to the supports 11a and 11b.

Figure 4:
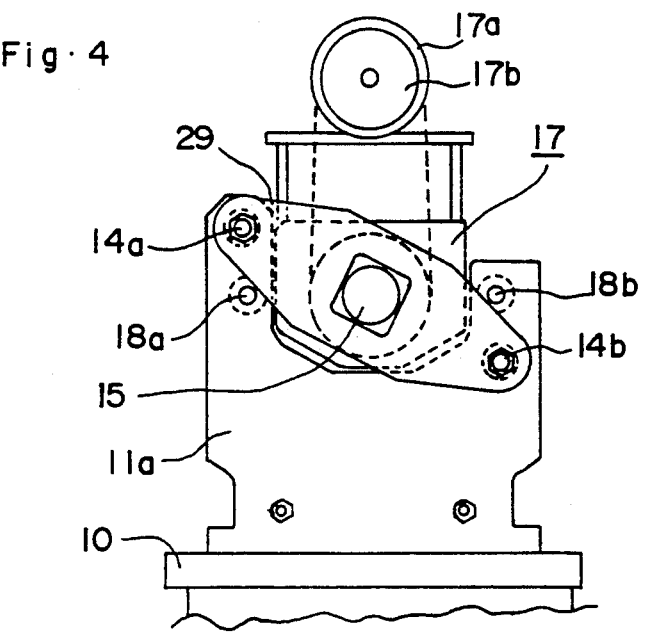
FIG. 4 is a side view of the inner surface shaper.

A cross plate 28 is fixed to the rear side of the first reciprocating stock 1, and one end each of the joint rods 14a and 14b is fixed to the cross plate 28. The joint rods 14a and 14b pass through the supports 11a, 11b and 11c, and the other end each of the joint rods 14a and 14b is fixed to a cross plate 29, to which the hydraulic cylinder 15 is fixed. The piston 16 of the hydraulic cylinder 15 is attached to the center of a fixture 27, which is apart from, but is connected to the rear side of the second reciprocating stock 17. The hydraulic cylinder 15, the supports 11a, 11b, and slide rods 18a, 18b make up the second reciprocating drive 20. The first working spindle 2, the second working spindle 22, the drive screw 8 and the hydraulic cylinder 15 are located on the center line of the bed 10, and the joint rods 14a and 14b are arranged symmetrically with respect to the center line of the bed 10, as seen from FIG. 4.

Clamp arms 31 and 31 are placed between the supports 11b and 11c to hold the opposite ends of the work piece B. A hydraulic cylinder 36 drives these clamp arms via an associated drive mechanism (not shown).

A tool supply arm 32 is rotated about its pivot 34 by an associated hydraulic cylinder 35. Another hydraulic cylinder 33 actuates the gripping jaw (not shown) of the tool supply arm 32. Still another hydraulic cylinder 51 pushes its pin 52 through the hole 54 of the work piece B (See FIG. 5) to put the work piece in position.

Figure 5:
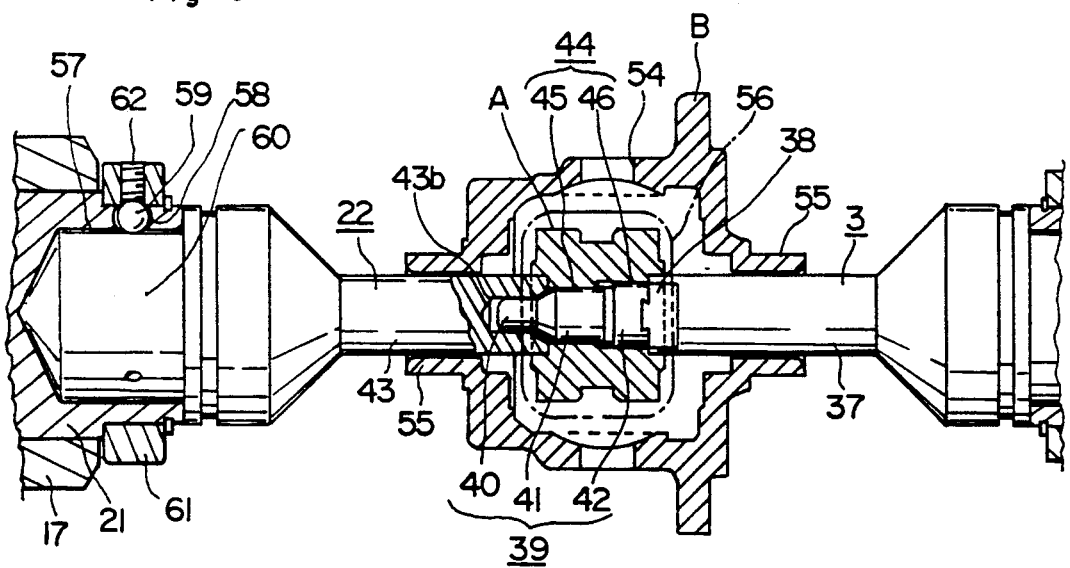
FIG. 5 is a plane view of the machining part of the inner surface shaper, partly in section.

As shown in FIG. 5, the working spindle 21 has a mount hole 57 made on its end, and three balls 59 are rotatably fitted in the apertures 58 made in the circumference wall of the mount hole 57. The root of the tool support 22 has three recesses made on its outer circumference to permit the balls 59 to fit therein when the tool support is inserted in the mount hole 57. A ring 61 has three tapped apertures made therein, and each tapped aperture has a set screw 62. The tool support 22 is inserted in the mount hole 57 of the working spindle 21 until the balls 59 have fitted in the corresponding recesses of the root 60 of the tool support 22, and then the ring 59 is fitted on the end of the working spindle 21. Finally the set screws 62 are driven to fix the tool support 22 to the end of the working spindle 21. The other tool support 3 has a similar structure.

Figure 6:
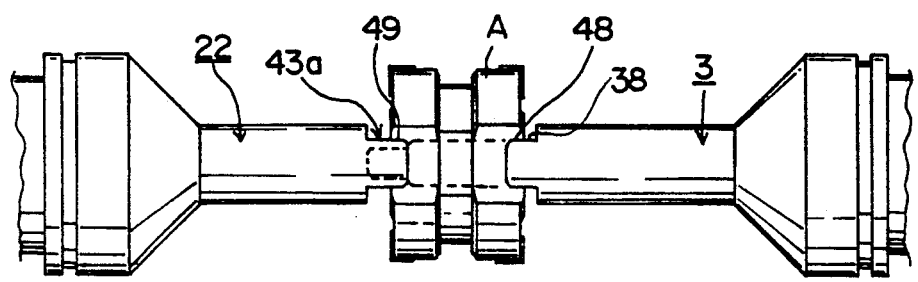
FIG. 6 is a front view of a tool and associated tool supports.
Figure 7:
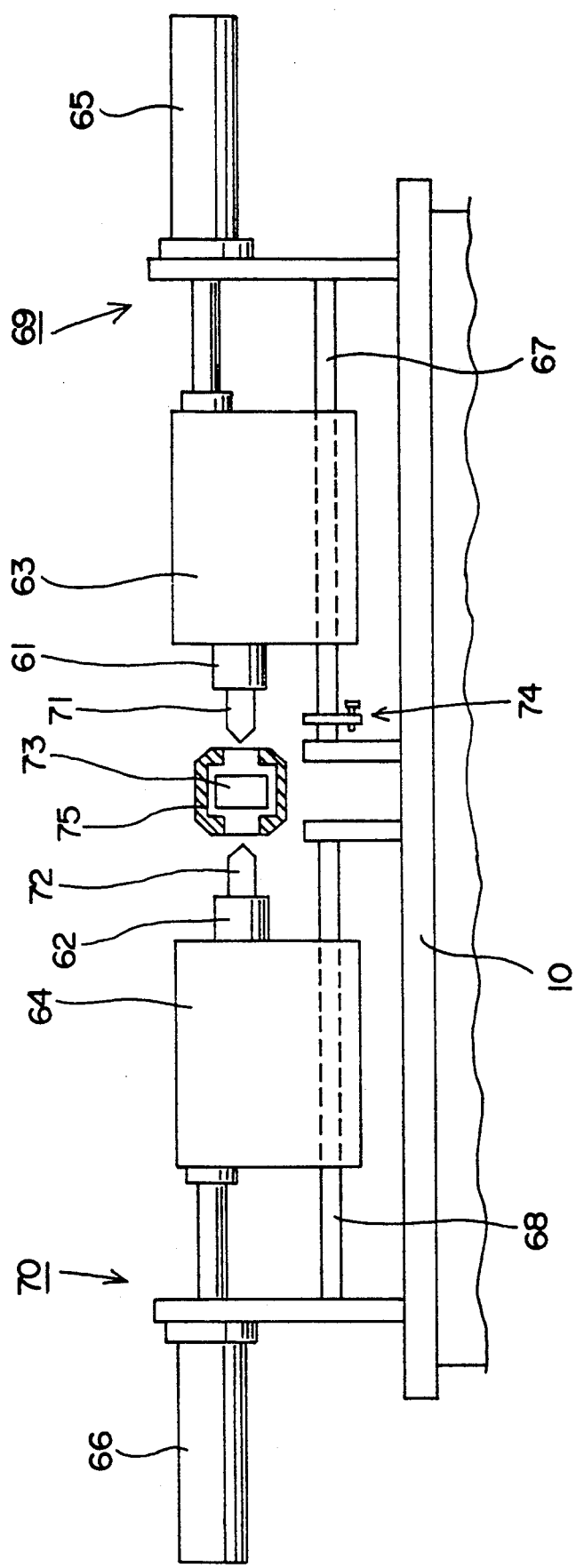
FIG. 7 is a front view of a conventional inner surface shaper.

As seen from FIGS. 5 and 6, the tool support 3 which is to be attached to the first working spindle 2 is a round body having a notched flat end 38 and an insertion tip 39 attached thereto. The insertion tip 39 is composed of a first top portion 40, a second intermediate portion 41 and a third base portion 42. Their diameters increase in the order named. The stepwise transition from the second to third portion has the effect of preventing a violent push in inserting the insertion tip 39 in the mount hole of the tool A, and permitting the tight and close connection between the tool A and the tool support 3.

The tool support 22 which is to be attached to the second working spindle 21 is a round body 43 having a notched flat end 43a and a first recess 43b to accomodate the first top portion 40 of the tool support 3.

The cutting tool A has a through hole 44 to accomodate the insertion tip 39 of the tool support 3, and the through hole 44 is consisted of a second hollow space 45 to accomodate the second intermediate portion 41 of the insertion tip 39, a third hollow space 46 to accomodate the third base portion 42 of the insertion tip 39 and enlarged recesses 48 and 49 to accomodate the notched flat end 38 of the tool support 3 and the notched flat end 49 of the tool support 22 at the opposite open ends of the through hole 44. When the tool supports 3 and 22 are inserted in the through hole 44 of the cutting tool A in opposite directions, the first top portion 40 of the insertion tip 39 of the tool support 3 is inserted in the first recess 43b of the tool support 22 so that the first and second working spindles 2 and 22 are aligned with their axes in exact alignment. The notched flat ends 38 and 43a of the tool supports 3 and 22 are fitted in the enlarged recesses 48 and 49 of the cutting tool A to permit transmission of the rotating power from the working spindles 3 and 22 to the cuting tool A.

As seen from FIG. 5, the work piece B is a hollow body having opposite cylindrical holes 55 and 55 to permit insertion of the tool supports 3 and 22 in opposite directions, an opening 56 to permit insertion of the cutting tool A and a hole 54 to permit insertion of a positioning pin 52 (See FIG. 3).

Now, the manner in which the inner surface shaper works is described below.

As seen from FIG. 3, the work piece B is brought to a predetermined position with the aid of carrier arms (not shown), and the hydraulic cylinder 51 is operated to insert the positioning pin 52 in the hole 54 of the work piece B, putting the work piece B in a prescribed position. Then, the hydraulic cylinder 36 is operated to turn the clamp arms 31 and 31, fixedly holding the opposite cylindrical projections 55 and 55.

The hydraulic cylinder 35 is operated to turn the tool supply arm 32 and put the cutting tool A in the inner space of the work piece B through the opening 56 of the work piece B.

The servomotor 4 is rotated to transmit its power to the drive screw 8 and the nut 12 via the belt wheels 6 and 9 and the belt 6a. Then, the first reciprocating stock 1 is made to advance toward the work piece B until the insertion tip 39 of the tool support 3 is inserted in the hole 44 of the cutting tool A in the work piece B.

The hydraulic cylinder 15 is operated to make the second reciprocating stock 17 to advance until the first top portion 40 of the insertion tip 39 of the tool support 3 has been inserted in the first recess 43b of the tool support 22, and until the notched flat end 43a of the tool support 22 has been inserted in the enlarged recess 49 of the cutting tool A.

Thus, the cutting tool A is sandwiched between the tool support 3 of the first working spindle 2 and the tool support 22 of the second working spindle 21 under pressure. Thanks to the bolt-and-nut drive 8 and 12 pushing one side of the cutting tool A via the tool support 3 the cutting tool A can be brought to a correct position, and the cutting tool A can be positively held by applying an increased push to the other side of the cutting tool A with the aid of the hydraulic cylinder.

Next, the electric motors 1a and 17a are made to start, synchronously rotating the first and second working spindles 2 and 21, and hence the cutting tool A sandwiched therebetween is rotated. The servomotor 4 is rotated, making the first reciprocating stock 1 to advance through the agency of the bolt-and-nut drive 8 and 12, and accordingly feeding the cutting tool A to give the inner surface of the work piece B a desired shape.

It should be noted that the hydraulic cylinder 15 and the first reciprocating stock 1 are connected by the joint rods 14a and 14b, thus permitting these joint rods to bear the counter force to the push applied by the hydraulic cylinder 15 to the second reciprocating stock 17, preventing withdrawal of the first reciprocating stock 1 which otherwise, would be caused by the pressure applied by the hydraulic cylinder 15 to the second reciprocating stock 17. Thus, there appears no distortion anywhere in the direction in which the first reciprocating stock 1 would be withdrawn.

Also, it should be noted that the first working spindle 2, the second working spindle 21 and the hydraulic cylinder 15 are aligned and positioned on one and same center line of the bed, and that the joint rods 14a and 14b are positioned symmetrical with respect to the center line of the bed. As a result the counter force to the push applied by the hydraulic cylinder 15 to the second reciprocating stock 17 is directed to the center line of the bed, and it cannot be directed aside. Thus, there is no fear of causing such a distortion in both reciprocating stocks 1 and 17 as would bend either working spindle 2 or 21.

The hydraulic cylinder 15 and the first reciprocating stock 1 are connected by the joint rods 14a and 14b, and therefore, the first reciprocating stock 1 moves forward to feed the cutting tool A, and then the second reciprocating stock 17 moves backward, keeping a fixed distance therebetween to prevent the hydraulic cylinder 15 from generating a correspondingly increasing pressing force which would be finally applied to the servomotor 4. Thus, the servomotor 4 can be a small power motor.

For the same reason the drive screw 8 is free of undesired increased stress. Arrangement of the drive screw 8 in alignment with the first working spindle 2, the second working spindle 21 and the hydraulic cylinder 15 causes the counter force to the feeding of the cutting tool A to be directed to the center axis of the drive screw 8, thereby preventing the uneven wearing and/or bending of the drive screw 8, and permitting the inner surface shaper to retain its capbility of giving a work piece a desired shape with accuracy for an extended length of time.

What is claimed is:

1. An inner surface shaper comprising, on a bed,:
   a first reciprocating stock having a first working spindle and a drive screw aligned with each other;
   a first reciprocating drive having a servomotor to drive said drive screw for making a linear reciprocating motion of said first reciprocating stock;
   a second reciprocating stock having a second working spindle in opposite relation with said first working spindle;
   a second reciprocating drive having a hydraulic cylinder to drive said second reciprocating stock toward and apart from said first reciprocating stock; and
   a tool rest placed between said first working spindle and said second working spindle to permit a tool to cut and shape the inner surface of a work piece, said first reciprocating stock and said second reciprocating stock being arranged and movably fixed to said bed with said first working spindle, said second working spindle, said drive screw and said hydraulic cylinder arranged along the center line of said bed; said hydraulic cylinder and said first reciprocating stock being connected by two joint rods which are arranged symmetrically with respect to the center line of said bed.

* * * * *